Patented Aug. 25, 1953

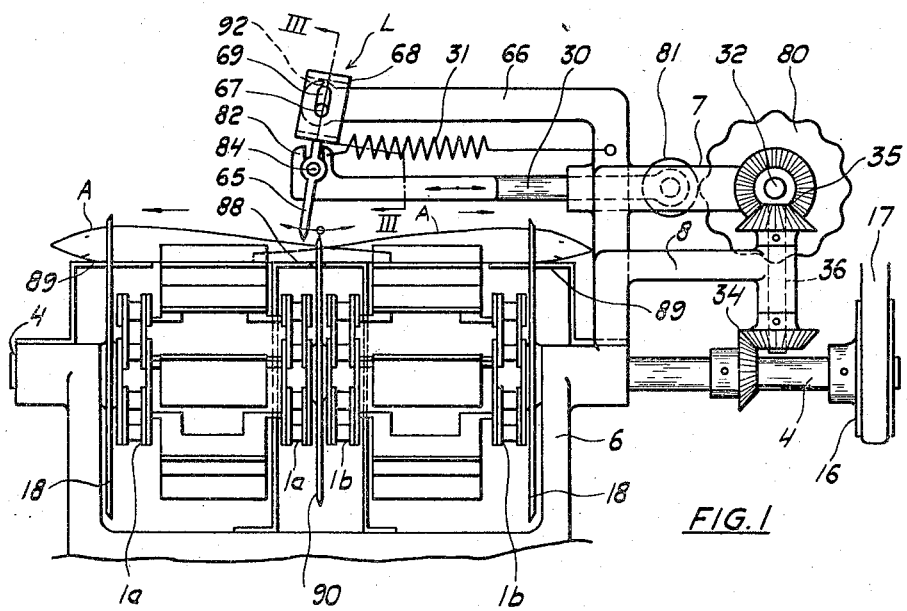

2,649,613

UNITED STATES PATENT OFFICE 2,649,613

APPARATUS FOR POSITIONING FISH

Paul Danielsson, Stockholm, Sweden, assignor to Arenco Aktiebolag, Stockholm, Sweden, a Swedish joint-stock company Original application April 17, 1945, Serial No. 588,789. Divided and this application December 29, 1948, Serial No. 67,843

8 Claims. (Cl. 17—2)

This invention is a division of my patent No. 2,563,008, for Apparatus for Positioning Fish, dated August 7, 1951.

It is an object of the invention to provide improved means for positioning the fish by displacing them longitudinally, for example, relative to dressing means such as means for cutting the fish into definite thicknesses at their tail ends.

Another object of the invention is to maintain or rather increase the possibility of displacing the fish even though the fish might taper largely.

Still another object of the invention is to increase the efficiency and rapidity of positioning fish that are supplied in an unarranged condition with respect to the directions of their heads so as to sift them out into two groups.

A further object of the invention is to provide novel means for performing said positioning which is not affected by coatings or scales and slimy substances of the fish.

With these and other objects not specifically mentioned in view, the invention consists in the construction and combination of parts which will be hereinafter fully described and then particularly pointed out in the claims hereunto appended.

In the drawings:

Fig. 1 is an end view of a machine provided with means embodying the invention;

Fig. 2 is an elevational side view of said end of the machine; and

Fig. 3 is a sectional view on the line III—III of Fig. 1.

Referring to the drawing, a fish locating member L consisting of an edgewise positioned plate 65 extends longitudinally of two parallel fish conveyors 1a and 1b. The plate 65 is pivotally journalled on a bracket 66 on the machine frame by means of a holder member consisting of a spindle 67 inserted into the front end 92 of the bracket 66 and extending through oval slots 69 in the head 68 of the plate 65 so that the plate 65 can adjust itself vertically on the spindle 67. Rapid reciprocating swinging movements are imparted to the plate 65 by means of a cam 80 secured to a horizontal shaft 32 and actuating a roller 81 rotatably mounted on a rod 30. The rod 30 is slidably mounted in the bracket 66. A tension spring 31 interconnecting the bracket 66 and a forked front end 82 of the rod urges the roller 81 against the cam 80. The forked front end 82 of the rod 30 projects into a recess 83 in the plate 65 and embraces a pin 84 inserted into the plate 65 and being parallel to the spindle 67. The bevelled bottom edge 87 of the plate 65 is inclined downwards in the direction P of travel of the fish.

The plate 65 operates above a fish supporting plate 88 fixed to the machine frame 6 between the two fish conveyors 1a and 1b. The conveyors 1a and 1b consist each of a pair of chains which run over sprockets 5 secured to a driving shaft 4 rotatably journalled in the machine frame 6 as well as over idler sprockets (not shown). To the shaft 4 is secured a pulley 16 which is driven by a belt 17. Each conveyor 1a and 1b is provided with fish carrier pockets formed between side plates or impellers 2, and bottom plates 3. The shaft 32 is rotatably journalled in a bracket 7 and driven by means of a bevel gear 35 by a vertical shaft 36 journalled in a bracket 8. The shaft 36 is driven by the shaft 4 by means of a bevel gear 34. At the outer sides of the conveyors 1a and 1b are mounted plates 89 for supporting the head ends of the fish. In addition to the head cutters 18 secured to the shaft 4, another cutter 90 is secured to said shaft between both the conveyors and adapted to cut off the tail ends of the fish.

In the operation of this apparatus the fish A are advanced in unarranged condition with respect to their head ends and when engaging the inclined bottom edge 87 of the plate 65 they will lift said plate slightly. By means of the vibratory means including the cam 80 and forming part of the motion transmitting means including the shafts 4 and 36 and the rod 30 the plate 65 is swung so that its bottom edge 87 is reciprocated rapidly crosswise of the path of travel of the fish. From the drawing it is evident that the plate 65 acts by reciprocating movements repeatedly upon each individual fish when each individual impeller 2 moves below and past the edge 87 of the plate, and thereby it will act upon the fish against their scales and fins while the fish are supported by the conveyors and the plate 88, whereby the fish are sifted out into two groups, one group being displaced head first to the left and the other group being displaced head first to the right in Fig. 1. Thereby the tapered shape of the fish assists in working the fish lengthwise away from the centre of the machine, until the plate 65 has descended into a position in which the top plate 91 of the head 68 rests on the front end 92 of the bracket 66 serving as an abutment for the spindle 67. The efficiency of the plate 65 operating with its edge 87 in engagement with the body of the fish will be practically unaffected by slimy coatings on the fish. Due to its capacity of accommodation to the thickness of the tapering fish it will increase its efficiency the more the body of the fish tapers. The displacement of the fish will be defined by the thickness of their tail ends. That is to say, the thickness of the rear portion of the fish at the cut performed by the tail cutter 90 will be definite and uniform since the edge 87 of the plate 65 and the cutting edge of the cutter 90 are substantially aligned, i. e. they are located substantially in the same vertical plane extending in the fish feeding direction, so that the thickness of the cut at the tail end will be substantially equal to the distance between the plate edge 87 and the supporting table 88 limited and defined by arresting the downward movement of the plate 65 as described. Consequently the fish will by the cutters 18 and 19 be cut into definite lengths and definite thicknesses at their tail ends.

I claim:

1. Fish locating means comprising, in combination with means feeding the fish transversely, a spindle extending above and longitudinally of the path of travel of the fish, a fish locating member having a rigid bottom edge which extends in the fish feeding direction, said locating member being pivotally mounted on said spindle and movable transversely to said spindle to press by said edge upon the fish by its own weight, and means operatively associated with said member to impart to said member short and rapid vibratory swinging movements about said axis crosswise of the fish feeding direction to displace the fish longitudinally.

2. Fish locating means comprising, in combination with means for supporting and feeding the fish transversely, a spindle extending above said means longitudinally of the fish feeding direction, a fish locating member having a rigid bottom edge which is adapted to engage the fish and extends longitudinally of the fish feeding direction, said locating member having a head provided with a substantially vertical slot and being substantially vertically slidably pivoted to said spindle which extends through said slot and serves as a guide for movement of said member towards said supporting means and also serves as an abutment limiting said movement, and means operatively associated with said member to impart to said member short and rapid vibratory swinging movements about said spindle crosswise of the fish feeding direction to displace the fish longitudinally.

3. Fish locating means comprising, in combination with means for supporting the fish, a holder member associated with said supporting means, a rigid scraper yieldingly slidably mounted on said holder member to be movable towards and away from said supporting means and yieldingly engage the fish, and means operatively associated with said scraper for imparting to said scraper short and rapid vibratory movements to displace the fish longitudinally on said supporting means.

4. Fish locating means comprising, in combination with means for supporting the fish, a holder member associated with said supporting means, a rigid scraper loosely slidably mounted on said holder member to be movable towards and away from said supporting means and press upon the fish by its own weight, and means operatively associated with said scraper for imparting to said scraper short and rapid vibratory movements to displace the fish longitudinally on said supporting means.

5. Fish locating means comprising, in combination with means for supporting the fish, a holder member associated with said supporting means, a rigid scraper yieldingly slidably mounted on said holder member to be movable towards and away from said supporting means and yieldingly engage the fish, and means operatively associated with said scraper for imparting to said scraper short and rapid vibratory movements to displace the fish longitudinally on said supporting means, said holder member and said scraper being adapted to abut each other to limit the movement of said scraper towards said supporting means.

6. Fish locating means comprising, in combination, a fish locating member having a rigid fish body engaging bottom edge and being adapted to reciprocate said edge transversely to displace the fish longitudinally, a conveyor having impellers for feeding the fish laterally to and longitudinally of said edge, and means operatively interconnecting said conveyor and said locating member and comprising vibratory means adapted to control said locating member to reciprocate said edge transversely of the fish feeding direction repeatedly upon the passage of each individual impeller past said edge, said locating member being loosely suspended to be elevated by the laterally advancing fish and press upon the body of the fish by its own gravity.

7. Fish locating means comprising, in combination, a fish locating member having a rigid fish body engaging bottom edge and being adapted to reciprocate said edge transversely to displace the fish longitudinally, a conveyor having impellers for feeding the fish laterally to and longitudinally of said edge, and means operatively interconnecting said conveyor and said locating member and comprising vibratory means adapted to control said locating member to reciprocate said edge transversely of the fish feeding direction repeatedly upon the passage of each individual impeller past said edge, said locating member being adapted to yieldingly engage the fish and being pivoted above said conveyor at an axis extending longitudinally of the fish feeding direction.

8. Fish locating means comprising, in combination, a fish locating member having a rigid fish body engaging bottom edge and being adapted to reciprocate said edge transversely to displace the fish longitudinally, a conveyor having impellers for feeding the fish laterally to and longitudinally of said edge, and means operatively interconnecting said conveyor and said locating member and comprising vibratory means adapted to control said locating member to reciprocate said edge transversely of the fish feeding direction repeatedly upon the passage of each individual impeller past said edge, said locating member having its edge inclined to the path of travel of the fish and being loosely suspended above said conveyor to be elevated by the laterally advancing fish.

PAUL DANIELSSON.

References Cited in the file of this patent

UNITED STATES PATENTS

| Number | Name | Date |
|---|---|---|
| 804,733 | Kenney | Nov. 14, 1905 |
| 1,125,655 | Cleveland | Jan. 19, 1915 |
| 1,320,990 | Butler | Nov. 4, 1919 |
| 1,642,444 | Hovden | Sept. 13, 1927 |
| 2,245,330 | Danielsson | June 10, 1941 |
| 2,263,694 | Grayson | Nov. 25, 1941 |
| 2,263,695 | Grayson | Nov. 25, 1941 |
| 2,311,176 | Hutton | Feb. 16, 1943 |
| 2,321,086 | Hutton | June 8, 1943 |
| 2,413,383 | Savrda | Dec. 31, 1946 |
| 2,439,657 | Hexter et al. | Apr. 13, 1948 |
| 2,541,046 | Fonken | Feb. 13, 1951 |

FOREIGN PATENTS

| Number | Country | Date |
|---|---|---|
| 370,405 | Germany | Mar. 2, 1923 |
| 382,245 | Germany | Sept. 29, 1923 |